Patented Dec. 4, 1945

2,390,098

UNITED STATES PATENT OFFICE 2,390,098

PREPARATION OF LACTONITRILE ACETATE

Virgil L. Hansley and John E. Bristol, Niagara Falls, N. Y., assignors to E. I. du Pont de Nemours & Company, Wilmington, Del., a corporation of Delaware No Drawing. Application August 21, 1940, Serial No. 353,538

10 Claims. (Cl. 260—464)

This invention relates to the production of lactonitrile acetate by the reaction of hydrocyanic acid with vinyl acetate. The object of the invention is to provide an improved method for carrying out this reaction for the production of lactonitrile acetate. Other objects will be apparent from the following description of the invention.

The reaction of hydrocyanic acid to vinyl acetate to form lactonitrile acetate is disclosed and claimed in the copending application by Ellsworth Knowlton Ellingboe, filed August 20, 1940, Serial No. 353,417.

We have found that by the addition of an appreciable quantity of acetaldehyde to the reaction mixture, the time required for completing the reaction is greatly decreased and improved yields are obtained. To practice the invention we may, for example, prepare a mixture of vinyl acetate and acetaldehyde in such proportions that there is 0.1 to 1 mole of acetaldehyde for each mole of vinyl acetate and react this mixture with hydrocyanic acid in the presence of an alkaline catalyst. Any substance having a distinct alkaline reaction may be used as catalyst, and the catalytic activity is roughly proportional to the alkalinity of the material used. For example, we may use alkali metal or alkaline earth metal hydroxides or cyanides, or other alkaline salts. Likewise, organic materials having an alkaline reaction such as alkyl amines, containing alkyl groups having from 1-4 carbon atoms may be utilized as catalysts. Preferably we use tertiary amines of low molecular weight, for example, trimethylamine or triethylamine. A relatively small amount of catalyst is required. For example, for a strongly alkaline catalyst such as alkali metal cyanide or a trialkylamine, a catalyst concentration of 0.5 to 2% by weight of the reaction mixture gives excellent results. Still smaller amounts may be used if desired. For less alkaline catalysts, larger amounts, e. g. up to 10% may be required.

One method of carrying out the reaction is to add the catalyst to the mixture of acetaldehyde and vinyl acetate and then add thereto the hydrocyanic acid at a suitable rate. The reaction is exothermic and preferably means for cooling should be employed to maintain the reaction temperature at about 20–30° C. While the preferred temperature of 20–30° C. gives optimum yield in minimum time the invention is not restricted thereto. The reaction will proceed at temperatures as low as 0° C. (although more slowly) and may be carried out at temperatures of 100° C. and higher, provided that the temperature is kept below the decomposition temperatures of the reactants and product. If temperatures above the boiling point of the reaction mixture are utilized, the reaction should be operated under sufficient pressure to maintain a liquid phase.

In a preferred method of practicing the invention we utilize the product, lactonitrile acetate, as diluent for the reaction mixture. If desired, in this method other liquids which do not react with the reaction ingredients or the product may be used in place of lactonitrile acetate as the diluent. However, lactonitrile acetate is the preferred diluent as its use eliminates the necessity of removal of diluent from the product. In practicing this method we first add the alkaline catalyst to the diluent material, e. g. lactonitrile acetate, and then pass into the mixture of catalyst and lactonitrile acetate a mixture of hydrocyanic acid, vinyl acetate and acetaldehyde. Preferably, the hydrocyanic acid is present in amount equal to about 1 mole hydrocyanic acid per mole of vinyl acetate, but an excess of either reactant may be used if desired. This mixture is added at a suitable rate to the lactonitrile acetate containing the catalyst. The rate of addition is controlled so as to avoid overheating of the reaction mixture caused by the exothermic nature of the reaction. Preferably, the reaction vessel is cooled at the same time by any conventional cooling means to maintain a reaction temperature of 20–30° C. After the reaction is complete, the alkaline catalyst and acetaldehyde may be removed and a quantity of lactonitrile acetate equal to that formed by the reaction is removed as product. The lactonitrile acetate remaining may be used for a succeeding operation.

The removal of the alkaline catalyst may be accomplished by conventional means, for example, by filtration or settling if solid catalyst insoluble in the reaction mixture, e. g. alkali cyanide, is used. If a soluble catalyst such as triethylamine is used, it may be removed by known chemical means, or by distillation. For example, triethylamine may be removed by washing the product with an aqueous solution of a strong acid such as hydrochloric acid or even with acetic acid or other suitable organic acid which will form complexes with organic amines.

The above described method using lactonitrile as diluent likewise may be carried out in a continuous cyclic manner whereby the lactonitrile containing a catalyst is continuously circulated through an extended reaction space, for example, a coiled pipe or the like, and the mixture of hydrocyanic acid, vinyl acetate and acetaldehyde is introduced into the stream at a convenient point.

In this method the product is continuously flowed out of the reactor at a point sufficiently far distant from the point of introduction of the reactants to insure complete reaction. The alkaline catalyst and acetaldehyde may be recovered from the product and returned continuously to the reaction mixture. The reaction vessel or tube may be cooled to 20–30° C. by means of cold water or other suitable refrigerant.

In using lactonitrile or other material as diluent for the reaction as above described, the volume of the reaction mixture will vary for optimum conditions depending upon the efficiency of the method of cooling employed. Under ordinary conditions where suitable cooling is provided a reaction system containing 100 pounds of lactonitrile acetate is capable of producing 200 pounds per hour of the product. The heat of reaction is 25.5 kg. cal. per mole of product.

Example I

The apparatus consists of a vertical stainless steel coil immersed in a cooling bath, a pump for continuous circulation of the reaction mixture, a reservoir in which the product accumulates and is drawn off, and a valved inlet through which the reagents may be added at the top of the coil.

The reaction system is filled with lactonitrile acetate containing 1% of 40 mesh KCN, kept in suspension by the circulation induced by the pump. A mixture of the following composition is continuously fed in through the valved inlet at the top of the reaction tube:

| | Percent by weight |
|---|---|
| Vinyl acetate | 64.5 |
| Acetaldehyde | 15.8 |
| Hydrocyanic acid | 19.7 |

The temperature of the reaction mixture is held at 25–35° C. As the quantity of lactonitrile acetate in the system increases, it overflows from the reservoir. Powdered (40 mesh) KCN is continuously added to the system to make up for that removed by the product. Preferably, the reservoir is of such dimensions that the catalyst settles to the bottom of the reservoir and thence re-enters the reaction system, while catalyst-free product flows from the top of the reservoir. The product is fractionally distilled after removal of any suspended KCN by settling, filtration or centrifuging. Acetaldehyde is recovered from the first distillate, together with traces of HCN and vinyl acetate, and may also be returned to the reaction mixture. The recovered KCN may also be re-used. The yield of lactonitrile acetate is in excess of 95% of theory.

Example II

The reaction is carried out in the same manner as described in Example I, except that 1% of triethylamine is used instead of KCN. In this case the catalyst (B. Pt. 87–89° C.) is recovered in the distillation foreshots and returned directly to the system.

The addition of the acetaldehyde to the reaction mixture in accordance with the present invention greatly decreases the time required for the reaction. Whereas without the addition of acetaldehyde we have found that reaction between vinyl acetate and hydrocyanic acid usually requires 2 to 6 hours for completion, we have found that by adding from 1/10 to 1 mole of acetaldehyde to the reaction mixture this reaction time is reduced to about 4–10 seconds.

We claim:
1. In a process for the production of lactonitrile acetate by reacting hydrocyanic acid with vinyl acetate in the presence of an alkaline catalyst, the step comprising adding acetaldehyde to the reaction mixture.
2. In a process for the production of lactonitrile acetate by reacting hydrocyanic acid with vinyl acetate in the presence of an alkaline catalyst, the step comprising adding 0.1 to 1 mole of acetaldehyde per mole of vinyl acetate to the reaction mixture.
3. The process for production of lactonitrile acetate which comprises reacting vinyl acetate with hydrocyanic acid in the liquid phase in the presence of an alkaline catalyst and 0.1 to 1 mole of acetaldehyde per mole of vinyl acetate.
4. The process for production of lactonitrile acetate which comprises reacting vinyl acetate with hydrocyanic acid in the liquid phase in the presence of an alkali metal cyanide and 0.1 to 1 mole of acetaldehyde per mole of vinyl acetate.
5. The process for production of lactonitrile acetate which comprises reacting vinyl acetate with hydrocyanic acid in the liquid phase in the presence of a tertiary amine and 0.1 to 1 mole of acetaldehyde per mole of vinyl acetate.
6. The process for production of lactonitrile acetate which comprises reacting vinyl acetate with hydrocyanic acid in the liquid phase in the presence of triethyl amine and 0.1 to 1 mole of acetaldehyde per mole of vinyl acetate.
7. The process for production of lactonitrile acetate which comprises continuously flowing a mixture of vinyl acetate, hydrocyanic acid and acetaldehyde containing 0.1 to 1 mole of acetaldehyde per mole of vinyl acetate into a body of lactonitrile acetate containing an alkaline catalyst and continuously removing lactonitrile acetate from said body at a location removed from the point of addition of said mixture.
8. The process for production of lactonitrile acetate which comprises continuously flowing a mixture of vinyl acetate, hydrocyanic acid and acetaldehyde containing 0.1 to 1 mole of acetaldehyde per mole of vinyl acetate into a body of lactonitrile acetate containing an alkaline catalyst maintained at a temperature of 20–30° C. and continuously removing lactonitrile acetate from said body at a location removed from the point of addition of said mixture.
9. The process for production of lactonitrile acetate which comprises continuously flowing a mixture of vinyl acetate, hydrocyanic acid and acetaldehyde containing 0.1 to 1 mole of acetaldehyde per mole of vinyl acetate into a body of lactonitrile acetate containing a suspension of alkali metal cyanide maintained at a temperature of 20–30° C. and continuously removing lactonitrile acetate from said body at a location removed from the point of addition of said mixture.
10. The process for production of lactonitrile acetate which comprises continuously flowing a mixture of vinyl acetate, hydrocyanic acid and acetaldehyde containing 0.1 to 1 mole of acetaldehyde per mole of vinyl acetate into a body of lactonitrile acetate containing triethyl amine maintained at a temperature of 20–30° C. and continuously removing lactonitrile acetate from said body at a location removed from the point of addition of said mixture.

VIRGIL L. HANSLEY.
JOHN E. BRISTOL.